Nov. 5, 1968  MICHIO B. NOZAKI  3,409,717
PROCESS FOR IMPROVING RESISTANCE OF THERMOPLASTIC MATERIALS
TO ENVIRONMENTAL STRESS-INDUCED CRAZING, AND
PRODUCT PRODUCED THEREBY
Filed Nov. 12, 1965  4 Sheets-Sheet 1
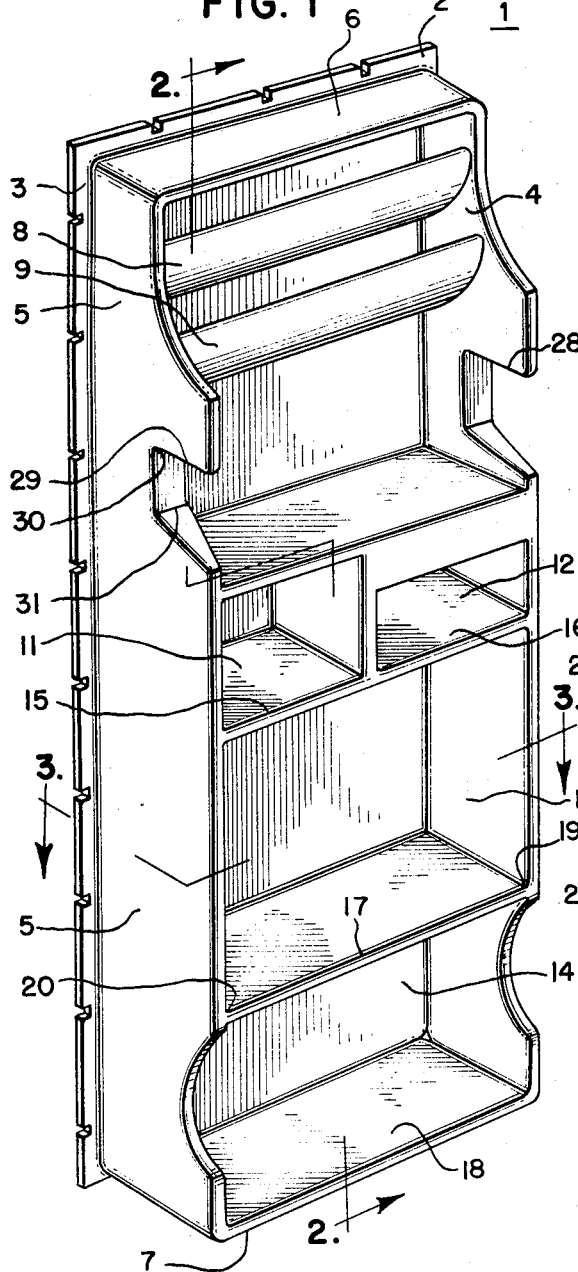
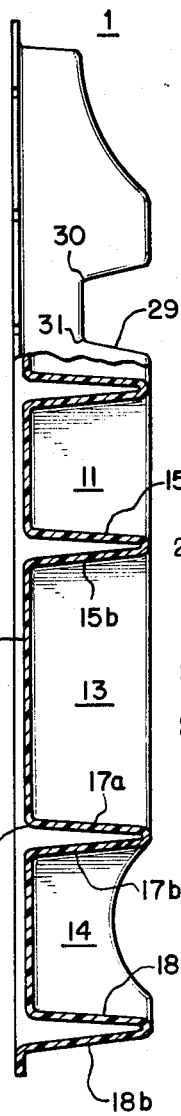
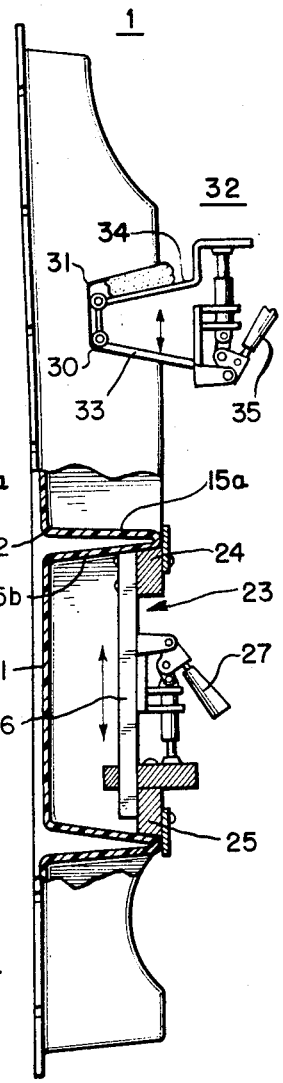
INVENTOR.
Michio B. Nozaki
BY
Attorney Nov. 5, 1968  MICHIO B. NOZAKI  3,409,717
PROCESS FOR IMPROVING RESISTANCE OF THERMOPLASTIC MATERIALS
TO ENVIRONMENTAL STRESS-INDUCED CRAZING, AND
PRODUCT PRODUCED THEREBY
Filed Nov. 12, 1965  4 Sheets-Sheet 2
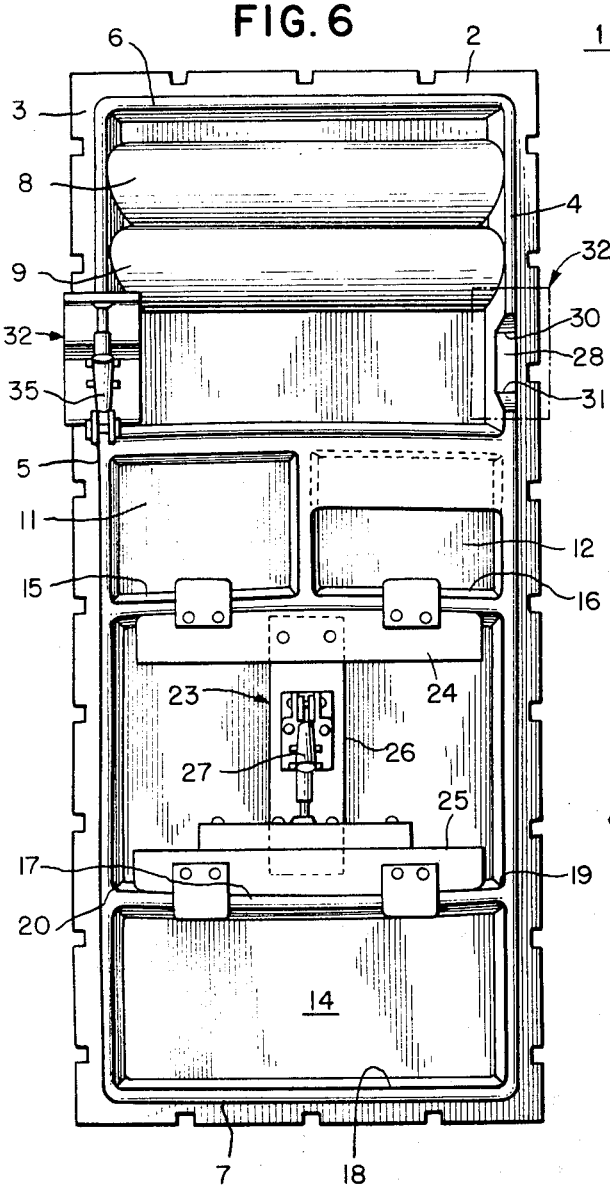
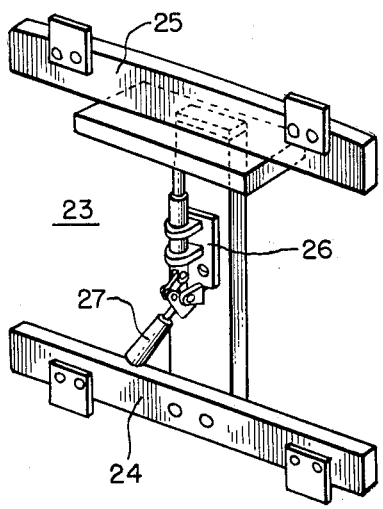
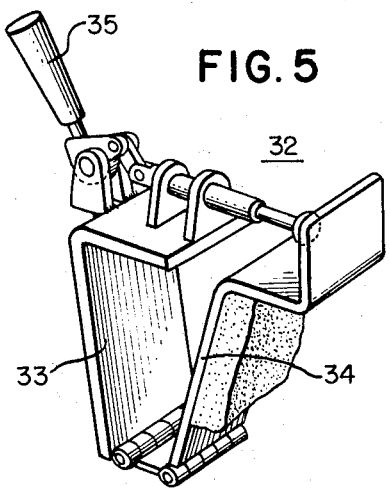
INVENTOR.
Michio B. Nozaki
BY
Attorney

STRESS-STRAIN DIAGRAM OF HIGH IMPACT POLYSTYRENE

ASTM D638 Type I Specimen
Specimen Thickness .123"
Strain Rate 0.24" in/min.

ASTM D638 Type I Specimen
Specimen Thickness .123"
Strain Rate 0.24" in/min.

STRESS-STRAIN DIAGRAM OF HIGH IMPACT POLYSTYRENE WITH A STRESS RELAXING CYCLE AT 12% ELONGATION.

COMPARISON OF STRESS CRAZE RESISTANCE OF STRAINED AND NON-STRAINED HIGH IMPACT POLYSTYRENE BY TENSILE CREEP TEST.

Material — High Impact Polystyrene Sheet .121" To .127"
ASTM D-638 Type I Specimen

COMPARISON OF DOOR LINER FAILURE TIME

INVENTOR.
Michio B. Nozaki
Attorney

United States Patent Office 3,409,717
Patented Nov. 5, 1968

3,409,717
PROCESS FOR IMPROVING RESISTANCE OF THERMOPLASTIC MATERIALS TO ENVIRONMENTAL STRESS-INDUCED CRAZING, AND PRODUCT PRODUCED THEREBY
Michio B. Nozaki, La Grange, Ill., assignor to General Electric Company, a corporation of New York
Filed Nov. 12, 1965, Ser. No. 507,481
3 Claims. (Cl. 264—291)

This invention relates to a process for improving the environmental stress-induced crazing resistance of plastics, and to the product which results from that process; more particularly, it relates to a process for inhibiting the crazing, or cracking, of thermoplastic materials such as polystyrene which results from the attack of many different types of agent on the material when it is in tensile stress.

It is known that many thermoplastic materials such as, for instance, polystyrene, are particularly subject to chemical attack if under tensile stress. It has been found that articles made of these materials, if subject to internal tensile stress, develop flaws due to the presence of chemical substances which do not attack the material when it is not under such stress. In its lesser aspect, this phenomenon appears in the form of shallow cracks on the surface of the body; this is usually termed "crazing." In its more serious aspects, the phenomenon is manifested by deep cracking and even complete breakage.

There are many uses of such materials where it is important that this crazing and breakage be prevented; one important such use is, for instance, in the field of domestic refrigeration. The inner liners of refrigerator doors are formed nowadays so as to be able to store a substantial number of articles and thereby increase the storage capacity of the refrigerator. This inner liner is usually made of a thermoplastic material which is formed from a flat sheet by any suitable means such as, for instance, conventional vacuum molding techniques. The formation provides a desired shape, which usually includes shelves on which articles may be placed. These articles often include quite heavy items such as, for instance, half gallons of milk and the like. When it is considered that the material is only 0.085 inch in thickness, that a half gallon bottle of milk weighs 6 pounds, and that it is often dropped from a height of one inch or more into position, it will be readily understood that substantial tensile stresses, both of the impact and steady type, are exerted at the edges of the shelves where they join the upright sides of the door liner.

It is to be kept in mind, also, in connection with domestic refrigerators, that the acids contained in perspiration, and the chemical agents contained in butter and like materials, will frequently be in contact with the door liner.

With the above thoughts in mind, it is a major object of my invention to provide a simple, effective, inexpensive process for improving the environmental stress resistance of thermoplastic materials.

More specifically, it is an object of my invention to achieve this goal by the process of subjecting selected portions of a formed article of thermoplastic material to stresses above the upper yield point of the material, and then releasing the article from such stresses so that the part which received permanent elongation will be maintained under permanent compressive stress by the adjacent areas of the article.

It is a further object of my invention to provide a product formed by the foregoing process, so that in those critical areas where crazing and breakage tend to occur, the article will be under a permanent compressive stress. In this connection, it has been found that the effect of a compressive stress on articles of thermoplastic material is directly opposite to that of a tensile stress; that is, the resistance of the article to crazing and breakage is substantially increased rather than being decreased.

In one aspect of my invention, I provide a process for improving the crazing resistance of a thermoplastic material such as polystyrene, for instance, which has been formed from a flat sheet to a desired shape. The shape, in order for my process to be needed, will normally include a portion frequently or continuously subjected to tensile forces. My process, in brief, provides initially the step of subjecting the portion whose stress resistance is to be increased to a tensile stress by cold-working. The stress exerted is sufficiently beyond the upper yield point of the material so as to effect substantial permanent elongation of the portion without, however, subjecting adjacent parts of the article to that stress. Then the portion is released from the tensile stress. As a result, the portion is provided with a permanent elongation; because of this deformation relative to adjacent parts, they press in and permanently subject the said portion to substantial compressive stress. It has been found that this has a highly beneficial effect in improving the environmental stress-induced crazing resistance.

A specific application of this process has resulted in a refrigerator door liner wherein the shelves are formed so that, at the edges where they join the remainder of the liner, a substantial amount of elongation is provided relative to adjacent parts. As a result, the edges of the shelf are in permanent compressive stress. This inhibits the crazing and breaking of thermoplastic materials, and particularly of polystyrene, to an amazing extent.

The subject matter which I regard as my invention is particularly pointed out and distinctly claimed in the concluding portion of this specification. My invention, however, together with further objects and advantages thereof, may best be understood by reference to the following description taken in conjunction with the accompanying drawings.

In the drawings, FIGURE 1 is a view in perspective of a refrigerator door liner which has been formed from a flat sheet of thermoplastic material into a suitable shape for the intended purpose;

FIGURE 2 is a view along line 2—2 in FIGURE 1;

FIGURE 3 is a view along line 3—3 in FIGURE 1;

FIGURE 4 is a view in perspective of a tool which may be used for providing a desired tensile force to a portion of the liner shown in FIGURE 1 in the selective manner required by my invention;

FIGURE 5 is a view in perspective of a second tool for similarly applying a force to a different part to cause strengthening of a different part of the liner of FIGURE 1;

FIGURE 6 is a front elevational view of the liner of FIGURE 1, with the devices of FIGURES 4 and 5 in position so as to cause a tensile stress to be provided on selected portions of the liner;

FIGURE 7 is a view along line 7—7 in FIGURE 6;

Figure 8:
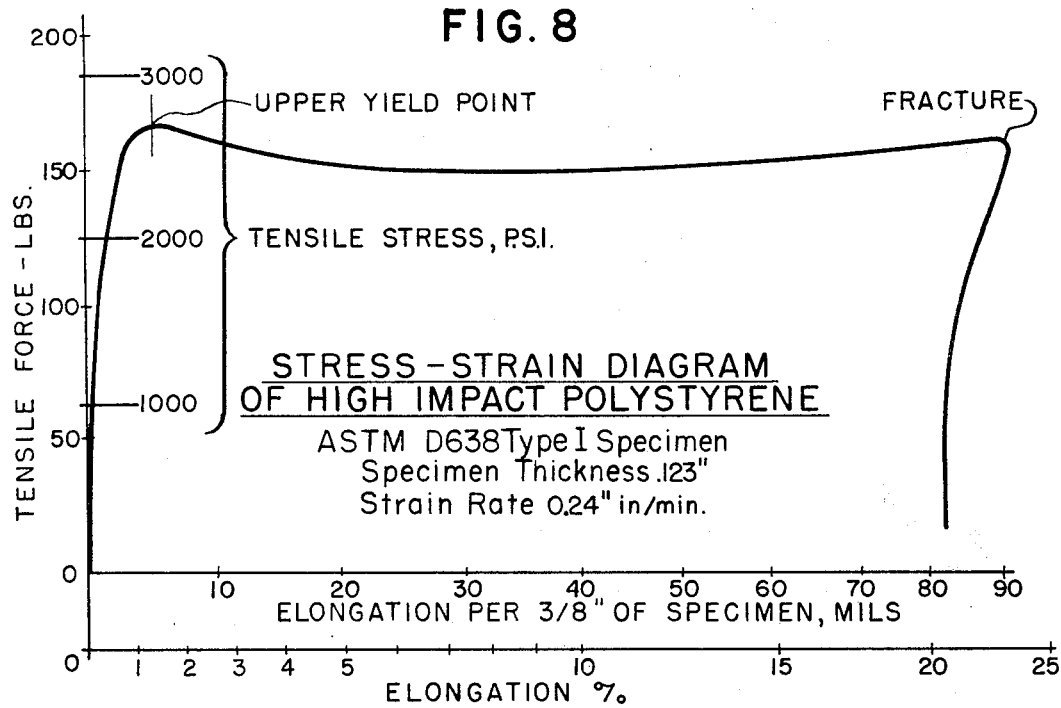
FIGURE 8 is a stress-strain chart, illustrating the elastic and viscoelastic regions and the upper yield point of a sample.

Referring now to FIGURE 1, there is shown a door liner which, it will be understood, is intended for use as the inner surface of the door of a domestic refrigerator. Liner 1, as can be seen from FIGURES 2 and 3, is formed from a thin sheet, conventionally on the order of 0.120 inch thick, of a suitable thermoplastic material. Such materials include, for instance, polystyrene, styrene acrilonitrile, acrilonitrile butadiene styrene, and cellulose acetate butyrate. Of these, polystyrene is substantially less expensive than the others. Consequently, if the tendency encountered in polystyrene, when subjected to rough usage in the presence of certain agents, toward crazing and breaking can be overcome, then the suitability of the material for use as a door liner is greatly increased.

While it is not a part of my invention, it will be understood that these formed door liners are conventionally formed from a flat sheet by any suitable process, and, in particular, generally by vacuum molding. Vacuum molding is effected by first pressing a flat sheet of heated thermoplastic material into approximately the desired shape by use of a form which has precisely the desired shape. The form is provided with openings through which a suction may be effected; that is, a vacuum may be provided so that simple atmospheric pressure on the other side of the sheet then causes the thermoplastic material to be forced into direct contact with the forming member so as to assume the exact shape thereof. As shown in FIGURE 1, the liner includes a peripheral flange 2 having openings 3 which permit suitable fastening members (not shown) to be used to secure the liner to the remainder of a refrigerator door assembly. Side walls 4 and 5 are provided, as shown in FIGURE 3. Side wall 4 includes an outer side 4a and an inner side 4b, and side wall 5 includes an outer side 5a and an inner side 5b. The side walls are joined by a top section 6 and a bottom section 7.

Between the side walls, there are provided appropriately formed shelves. For instance, curved shelves 8 and 9 may be provided for articles such as eggs. It will be understood, in this connection, that members formed entirely separately may later be positioned within shelves 8 and 9 to complete the egg-receiving assembly.

Also, several compartments may be provided such as those shown at 11, 12, 13, and 14. The floors of these compartments are provided respectively by shelf surfaces 15, 16, 17, and 18. As can be seen from FIGURE 2, shelf 15 includes an upper portion 15a and a lower portion 15b. Similarly, shelf 17 is made up of portions 17a and 17b, and shelf 18 is made up of portions 18a and 18b.

Each of these shelves is intended to receive articles to be stored; the larger compartments, such as compartment 13, may receive relatively large articles such as half gallons of milk, and the like. Of course, suitable guards and retainers will conventionally be assembled with the liner, prior to the final assembly of the door with a refrigerator.

The presence of articles in the compartments, resting on the shelves, causes a substantial amount of tensile stress to exist where the upper portion of the shelf joins the sides and back of the door liner 1. Referring specifically to shelf 17, portion 17a thereof joins side wall 4b at edge 19, and side wall 5b at edge 20. The shelf also joins the back 21 of liner 1 at a relatively sharp edge 22. With heavy articles resting on shelf section 17a, a substantial amount of tensile stress will normally exist along the edges 19, 20, and 22.

As explained above, there are many chemical substances which, when applied to a thermoplastic material under tensile stress, cause premature crazing and breakage of the material. Since the users of a refrigerator will frequently handle the door liner, and since butter and similar substances may often come into contact with the door liner, a liner of thermoplastic material is continuously in the presence of a number of materials of the type which tend to cause crazing and breakage.

In order to permit the use of an economical thermoplastic material such as polystyrene, while virtually eliminating the undesirable crazing and cracking, I propose to strain above the upper yield point of the material, by cold-working, the portions which normally tend to fail. "Cold-working" is intended to mean the working of the material at temperatures below the softening point of the material, and with particular emphasis on working at ordinary ambient temperatures.

For instance, in the case of ordinary polystyrene of the type commonly available in commerce and used for door liners, the upper yield point of the material—that is, the maximum strain that can be provided on the material without substantial permanent deformation—is considered to be on the order of 1%. As shown in FIGURE 8, there is very little permanent deformation of the material if the strain is within the upper yield point; that is, the material will tend to return to its previous shape with virtually no permanent elongation. However, if the strain on the material is increased above this amount, a noticeable permanent elongation of the material will result. That is, the material will not return substantially to its previous shape, but will remain deformed to a marked extent.

Figure 9:
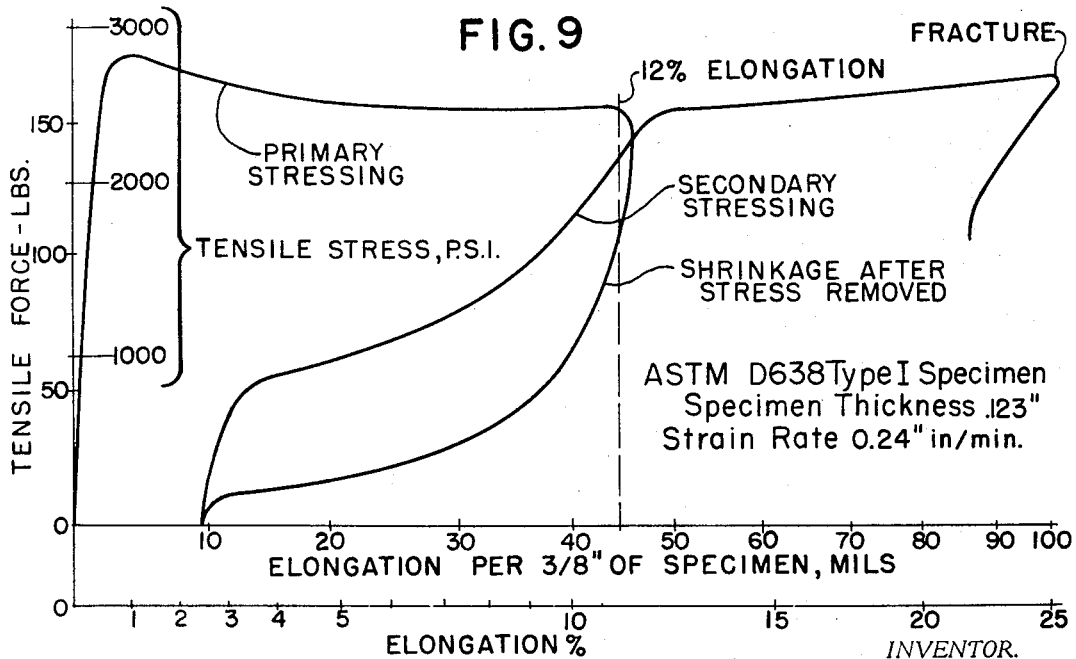
FIGURE 9 is another stress-strain chart, illustrating the permanent strain impressed on a sample when it is subjected to a primary elongation, and the stress-strain relationship for a later secondary stressing of the same sample.

For instance, when a polystyrene part is stressed at a strain rate of approximately 1%/min., the upper yield point of approximately 2800 p.s.i. is reached and then the stress level adjusts itself to the 2500 p.s.i. level. This stress level is maintained with minor change during further straining of the material; the material keeps elongating until it reaches the rupture point, as shown in FIGURE 8. When, for instance, the material is relieved of its stress after attaining a strain of 12% during the stressing procedure, the material shrinks slowly toward its original length; because of the viscoelastic nature of the material, the shrinkage occurs substantially in the manner shown by the declining curve in FIGURE 9, and a residual elongation on the order of 3 percent will remain permanently. If a second stressing cycle is provided on the same sample, as shown in FIGURE 9, the material develops a considerable amount of elongation prior to reaching the previously experienced stress levels. FIGURE 9 also shows that the ultimate strength of the material, i.e., the final stress level for fracture, is essentially unchanged by the first stress relieving cycle.

Using this information in connection with the door liner structure described, appropriate tools may be provided to effect flexing sufficient to cause substantial permanent strain in selected portions thereof. For instance, referring to FIGURE 4, there is shown a tool 23 having portions 24 and 25 which are movable toward and away from each other by a conventional assembly 26 having a handle 27. The handle is shown in a position such as to draw members 24 and 25 together. When the handle is moved upwardly part 25 is moved away from part 24.

Thus, when assembly 23 is positioned between section 15b and section 17a, and the handle 27 is then moved to spread members 24 and 25 apart, sections 15b and 17a will be flexed a substantial amount. As a result of this flexing, the edges of shelf portion 17a, that is, edges 19, 20, and 22 will be placed under tensile stress causing marked permanent strain.

The shape of tool 23 is selected so that the strain provided, by the spreading apart of members 24 and 25, at the edge portions of the shelf is substantially below the failure point of the material but above its upper yield point. I have found, for instance, that a flexing which provides elongation on the order of 1 percent to 20 percent in the case of polystyrene, is effective. Above 1 percent, the upper yield point has been passed and consequently a noticeable permanent elongation will have resulted; however, above 20 percent it has been found that the material is so close to fracture that there is substantial weakening thereof.

Substantially full effectiveness is reached as low as 12 percent flexing; this represents the preferred figure, since the greater the amount of flexing is kept below the rupture point, the quicker and easier the operation. Member 23 is kept in position for a period which, preferably, is at least on the order of three seconds; with lesser periods the effect tends to approach that of an impact stress, which is without beneficial result. While any reasonable period above 3 seconds may also be used, there is obviously, an upper time limit dictated by the fact that, over long periods, there is a "creep" effect tending to weaken the material. On the whole, it is preferable to maintain the length of the period within an hour. After the flexing period, the handle is moved to the release position, and the tool 23 may be removed from the liner assembly.

Liner assembly 1 also includes notches 28 and 29 in side walls 4 and 5 respectively. While these are not needed in connection with all refrigerators, they are typical of what may be required in a liner to be used in a refrigerator having shelves which swing outwardly; it will readily be seen that their shape renders them highly susceptible to crazing and breakage, particularly at the edge sections, such as those shown at 30 and 31 in connection with notch 29.

To strengthen this part of the liner, another appropriate tool 32 may be provided as shown in FIGURE 5. Tool 32 has parts 33 and 34 which may be drawn together, as shown, or spread apart (as shown in FIGURE 7) by use of handle 35. Referring again to FIGURE 7, it can readily be seen that with tool 32 in position, and with handle 35 having been moved to the stress-providing position, a substantial amount of deformation of the liner is provided, particularly at the edges 30 and 31. This deformation has, in practice, been found to be great enough so that the entire back 21 of the liner is bowed (as shown in FIGURE 7).

It is to be understood that the beneficial effect of this treatment to the door liner results from two separate factors. First, by the flexing of the part, the critical areas are stressed substantially beyond the elastic limit. Consequently, they are permanently elongated; this has been found to build up resistance to unfavorable environments. Second, because there is this residual permanent elongation, the portions which were subjected to the high stress are placed under compression.

Consequently, when tools 32 and 33 are removed after use, the edges 19, 20, and 22 of shelf section 17a and edges 30 and 31 of the notches 28 and 29, are different in two respects from their previous condition. First, they are elongated, that is, they actually have a greater measurement than before. Second, they are under substantial compressive stress.

Figure 10:
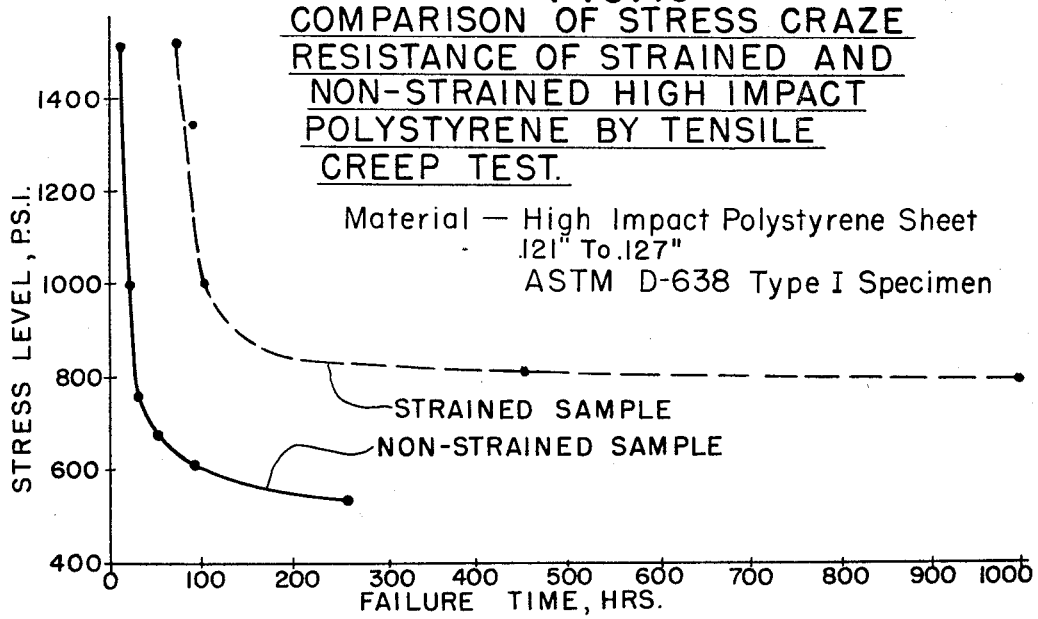
FIGURE 10 is a chart comparing failure time of unprocessed samples and of processed samples in a craze-inducing environment.
Figure 11:
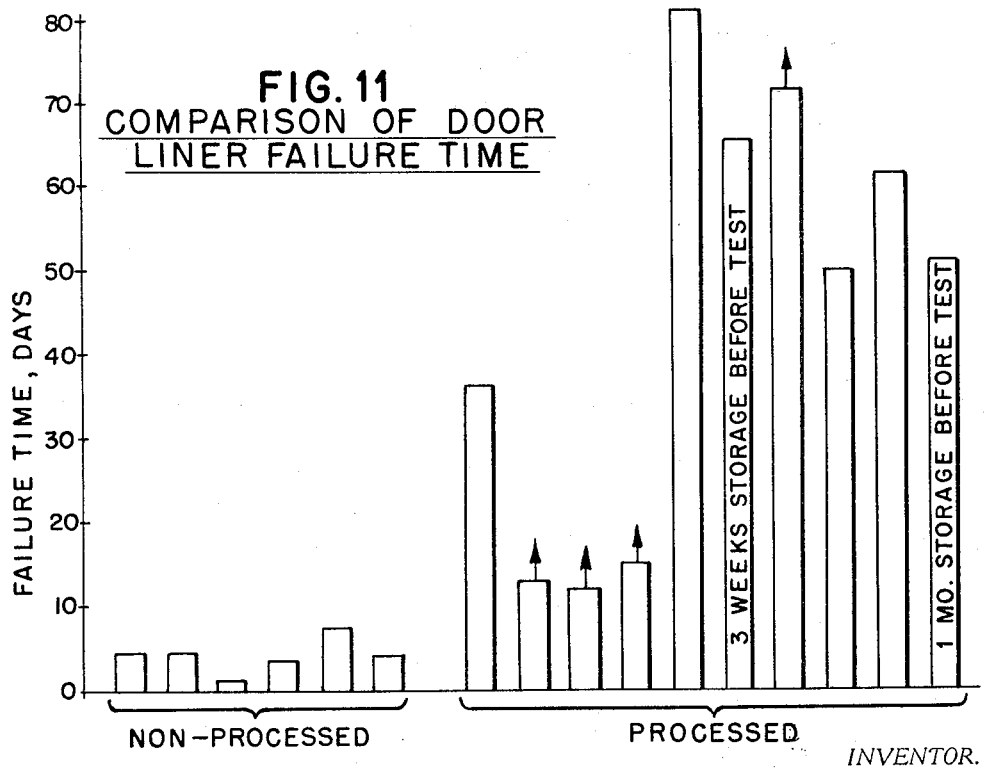
FIGURE 11 is a bar chart illustrating the improvement obtained by my process in the door liner of the figures comparative to door liners of a similar shape which have not been subjected to my process.

The amazing effectiveness of this technique can best be understood by referring to FIGURES 11 and 10. FIGURE 11 shows a comparison between six door liners which were not subject to the process of my invention, and eleven door liners which were subjected to my process. For the test, each of the liners was coated with a mixture of 50 parts of oleic acid and 50 parts of cottonseed oil; this has been found highly effective in inducing crazing. Each door liner was assembled in a refrigerator. The door shelves were then fully loaded. Each door was slammed shut twelve times daily, and full half gallon bottles of milk were dropped two inches onto the shelves once daily. As shown in FIGURE 11, the untreated door liners crazed and fractured between one and seven days after the start of the test—not one of them lasted beyond the seventh day. The minimum fracture period for a processed door liner was 49 days; although some underwent only 12 to 15 days of testing, these had no crazing at all. One processed door liner even lasted 80 days before failing.

Referring to FIGURE 10, two groups of tensile test specimens were subjected to tensile creep tests at various stress levels in a range of 550 p.s.i. to 1500 p.s.i. Every sample was coated on one side with the stress-craze inducing coating. The solid line is a pilot of failure time for ordinary high impact polystyrene. The broken line illustrates the failure time of similar material initially strained, by cold-working, 5%. At each stress level, the strained material lasted far longer than non-strained samples.

From the above, the great usefulness of my process as applied to polystyrene refrigerator door liners can readily be seen. In addition to the above tests, I also provided various elongations of samples of polystyrene, varying them from below the upper yield point all the way to the time fracture occurred. In those samples which were stretched an amount below the upper yield point of the material, no practically useful beneficial effect was obtained; fracture resulted in 4 to 25 hours when the parts were subjected to substantial tensile force after being coated with the mixture. However, as soon as the initial stretching of the material exceeded 1 percent, the upper yield point, a beneficial effect—in length of time before fracture for the same tensile force—became noticeable; when the initial stretching reached 12 percent, results were substantially as good as could be obtained with any additional stretching.

In addition to these tests, all conducted with polystyrene, tests were also conducted with samples of styrene acrylonitrile, acrylonitrile butadiene styrene, and cellulose acetate butyrate. These tests showed that with these other thermoplastic materials, similar benefits were obtained by use of my process. Of course, there were different upper yield points for the different materials; for instance, those points for acrylonitrile butadiene styrene and cellulose acetate butyrate were about 1.5 percent and 4 percent respectively. However, the basic aspect remained that straining, by cold-working, above the upper yield point, had pronounced beneficial effects.

While in accordance with the patent statutes, I have described what at present is considered to be the preferred embodiment of my invention, it will be obvious to those skilled in the art that various changes and modifications may be made therein, without departing from the invention; it is, therefore, aimed in the appended claims to cover all such equivalent variations as fall within the true spirit and scope of my invention.

What I claim as new and desire to secure by Letters Patent of the United States is:

1. A process improving the environmental stress resistance of a refrigerator door liner of thermopastic material which has been vacuum formed from a flat sheet into a desired shape including at least one shelf, said process comprising the steps of:
    (a) loading said shelf to provide a tensile stress at the edges thereof sufficient to strain the material beyond its upper yield point by cold-working thereby to effect substantial permanent elongation of the material at the edges, and
    (b) unloading said shelf to relieve said externally caused tensile stress, whereby the edges of said shelf are permanently subjected to substantial compressive stress.

2. The process defined in claim 1 wherein said tensile stress provides, while it is applied, an elongation of 1 to 20 percent and said material is high impact polystyrene.

3. The process defined in claim 2 wherein said tensile stress, while it is applied, provides an elongation of 12 percent.

References Cited

UNITED STATES PATENTS

| | | | |
|---|---|---|---|
| 2,669,209 | 2/1954 | Hoffman | 264—291 |
| 3,019,486 | 2/1962 | Stinson | 264—291 |
| 3,097,901 | 7/1963 | Schless | 312—214 |
| 3,218,378 | 11/1965 | Settles et al. | 264—295 |
| 3,274,047 | 9/1966 | Sloan | 264—293 |
| 3,302,820 | 2/1967 | Lander et al. | 312—214 |

FOREIGN PATENTS 810,102   3/1959   Great Britain.

OTHER REFERENCES

NBS Tech. Report 2106: April 1957, "Stretch-Oriented Transparent Plastics for Aircraft," 5 pages.

JULIUS FROME, *Primary Examiner.*

A. H. KOECKERT, *Assistant Examiner.*